(12) United States Patent
Rathus

(10) Patent No.: US 9,977,938 B2
(45) Date of Patent: May 22, 2018

(54) METHOD AND APPARATUS FOR ACCESSING ELECTRONIC DATA VIA A PLURALITY OF ELECTRONIC TAGS

(71) Applicant: Spencer A Rathus, Surfside, FL (US)

(72) Inventor: Spencer A Rathus, Surfside, FL (US)

(73) Assignee: HYDRA Group Holdings LLC, Mt. Laurel, NJ (US)

( * ) Notice: Subject to any disclaimer, the term of this patent is extended or adjusted under 35 U.S.C. 154(b) by 0 days. days.

(21) Appl. No.: 15/489,640

(22) Filed: Apr. 17, 2017

(65) Prior Publication Data

US 2017/0337404 A1    Nov. 23, 2017

Related U.S. Application Data

(63) Continuation-in-part of application No. 14/561,929, filed on Dec. 5, 2014, now Pat. No. 9,626,697.

(60) Provisional application No. 61/913,319, filed on Dec. 8, 2013, provisional application No. 61/913,320, filed on Dec. 8, 2013, provisional application No. 61/917,190, filed on Dec. 17, 2013.

(51) Int. Cl.
| | |
|---|---|
| G06K 7/10 | (2006.01) |
| G06Q 30/02 | (2012.01) |
| G06F 17/30 | (2006.01) |
| H04W 4/00 | (2018.01) |
| G06Q 10/08 | (2012.01) |

(52) U.S. Cl.
CPC ..... *G06K 7/10366* (2013.01); *G06F 17/3061* (2013.01); *G06Q 30/0255* (2013.01); *G06Q 30/0256* (2013.01); *G06Q 30/0259* (2013.01); *G06Q 30/0261* (2013.01); *H04W 4/008* (2013.01); *G06Q 10/08* (2013.01)

(58) Field of Classification Search
CPC ........... G06Q 30/0259; G06Q 30/0255; G06Q 30/0261; G06Q 30/0256; G06K 7/10366; G06F 17/3061
See application file for complete search history.

(56) References Cited

U.S. PATENT DOCUMENTS

2010/0013603 A1*  1/2010  Chatani .................. G06Q 30/02
                                                        340/10.6

* cited by examiner

*Primary Examiner* — Leon Flores
(74) *Attorney, Agent, or Firm* — John W. Olivo

(57) ABSTRACT

The disclosed methods and apparatus relate generally to the use of electronic devices to interact with electronic tags associated with objects, services, places, people, or animals ("objects") in order to access programming material related to these objects. The invention discloses the input of keywords, phrases, preferences, or interests into a user's device to search a plurality of electronic tags within a given physical range to access programming material from the tags—or via data links provided in the tags—that matches the keywords, phrases, preferences, or interests. Furthermore, the invention locates, maps, and labels the objects associated with this programming material on the user's display.

20 Claims, 8 Drawing Sheets

METHOD AND APPARATUS FOR ACCESSING ELECTRONIC DATA VIA A PLURALITY OF ELECTRONIC TAGS

CROSS-REFERENCE TO RELATED APPLICATIONS

This application, a continuation in part, claims the benefit of U.S. patent application Ser. No. 14/561,929, filed Dec. 5, 2014, which claims the benefit of Provisional Application No. 61/913,319, filed Dec. 8, 2013, Provisional Application No. 61/913,320, filed Dec. 8, 2013, and Provisional Application No. 61/917,190, filed Dec. 17, 2013. The entire contents of these provisional applications are herein incorporated by reference.

BACKGROUND OF THE INVENTION

It is no exaggeration to suggest that the world is awash with signals from electronic "tags" of one kind or another—tags such as RFIDs, rectifying antennas or rectennas, nantennas, NFC tags, proximity tags, smart cards, and printed electronics. Some printed matters such as books, magazines, and newspapers have tags that provide information about the content of the printed matter or enable you to purchase them. Some kinds of electronic tags can be printed directly on the pages. Articles of clothing in shops and department stores have electronic tags that contain information such as the origin of the merchandise, the price, sizing, and, if taken through a doorway without being removed or deactivated, "complaining" through emitting aversive beeps or alerting security personnel. Automobiles have electronic tags that gather GPS positioning data to alert dealerships, rescue agents, and legal authorities of the location of the vehicle when needed. Legal detainees or criminals may be fitted with electronic tags that communicate positioning data so that authorities can determine their location without continuous personal observation. Children and people with dementia may be tagged to prevent them from getting lost. People in effect carry electronic tags in their cell phones. Animals are frequently "chipped"—that is, fitted with electronic tags—so that they may be located, if necessary, for anxious owners or for scientists tracking migration patterns.

What is needed is a system and method that allows users to effectively interact with the electronic tags, and specifically a system and method that provides a means of interacting with the plurality of electronic tags to locate, tailor, map and display the various objects associated with the tags.

SUMMARY OF THE INVENTION

The present invention has capabilities that are improvements to systems and methods of accessing electronic information by addressing a new use of electronic tags or transceivers, including, but not limited to, RFID tags, rectifying antennas or rectennas, nantennas, NFC tags, proximity tags, smart cards, subscriber information and personal information in mobile communication devices, and printed electronics. The present invention enables individuals with smart phones and other electronic devices to scan a plurality of tags in the area to gather and display information about the scanned tags in their environments or venues. Users enable their smart phones or other electronic devices to scan a plurality of electronic tags within range of their devices to locate, map, and display those tags that hold encoded data or links to encoded data corresponding keywords or phrases that match their search queries. The electronic tags are associated with objects, people, services, places, animals, and so on ("objects") that are at least in part described by the keywords or phrases.

Because there may be an unlimited number of such tags within their range, the response could be overwhelming and in effect useless in obtaining electronic information associated with particular tags. In order to differentiate the electronic "wheat from the chaff" the method can also tailor—or narrow—results according to the interests or preferences of the user. Assuming that a user receives a plurality of signals from a plurality of tags, the user's display unit may display a map of the locations of tags, a description of the information associated with particular tags (e.g., a label such as the name of a store or animal, the presence of a woman seeking a man [WSM], or a coat in your size located in the shop around the corner and available for the next hour at a 40% discount). Further, by touching or clicking on the displayed item, the user of the system can have the opportunity to interact with the tag to engage in actions such as obtaining more information, making a purchase, or communicating with a human about the information contained in, or associated with, the tag. The tag, as noted, may also be capable of providing links that enable the individual to go online to engage in various actions; or upon selection, the user's device may go automatically to a URL wherein the individual may harness more information or act in various ways.

The electronic tags under discussion are varied. Not all of them have positioning capabilities. They have storage means of different capacities. Their ranges for accessing commands and transmitting data differ. Some of them are intended to provide minimal descriptive information about the objects with which they are associated. Others have the capacity to carry a good deal of information. Some have links to URLs such that a person scanning them will automatically link to an online destination or have the opportunity to select that action from a menu presented on his or her display unit. Still others comprise part of devices that have communication, storage, processing, and display means.

Although these electronic tags are varied, they have certain things in common. First, they are transceivers; that is, they are transmitters and receivers combined into a single unit. They also generally belong to the class of transceivers termed transponders, which transmit a designated signal based on reception of a specific incoming signal. Some of them can transmit more than one kind of signal, depending on the nature of the incoming signal. Second, at least some of the tags are becoming increasingly inexpensive. Rectifying antennas or rectennas, for example, are in some cases being produced at a cost of less than a penny. Third, users are finding that they have greater flexibility to use and position them, because they are becoming smaller and more flexible themselves. As noted by the Institute of Physics, "For a price of just one penny per unit the device, known as a rectifying antennas or rectennas, [as discussed in the] journal *Nanotechnology*, can be placed onto objects such as price tags, logos and signage so that we can read product information on our smartphones with one simple swipe" (http://www.iop.org/news/12/aug/page_56698.html; Wireless power for the price of a penny." (2012, August 10). *Nanotechnology*. Institute of Physics, http://www.iop.org/news/12/aug/page_56657.html). The rectifying antennas or rectennas can be printed onto these objects. In addition to printing rectifying antennas or rectennas themselves, digital information can also be printed onto rectifying antennas or rectennas; then devices such as smart phones can be used to scan an area for rectifying antennas or rectennas by transmitting signals to them, and therein receiving the digital information printed onto the rectifying antenna or rectenna.

One object of the present invention is to provide a means for using keywords or phrases entered into an electronic device as a means of interacting with a plurality of electronic tags to locate, map, and display the objects, services, places, people, or animals ("objects") with which they are associated, and to access information or programming material related to them. These keywords or phrases may be used as search criteria to identify electronic tags linked to electronic sources of related information. Alternatively, users may input their preferences, interests, or profile information that comprise search criteria. Moreover, the means disclosed make it possible for users to search in the "real world" for actual objects within the range of their devices and the tags without personally seeing them, hearing them, smelling them, or otherwise perceiving them through their biological sensory systems. In that sense, the invention expands their own sensory systems by electronic means. Nor can people "read the minds" of other people or extract historic and detailed information about that which they personally perceive, whereas the invention provides them with access to a variety of programming materials associated with them.

The method disclosed in the present invention may encourage standardization of at least a subset of electronic tags, such that they become richer in the information they supply or in the links they offer to additional programming material. Moreover, at least a subset of electronic tags can be encoded or populated with keywords or phrases that are correlated with users' interests, preferences, or needs as specified in the form of user inputted key words or phrases.

Content or programming material accessed by the user can be housed "locally," that is, within the electronic tag, or it can be stored remotely, in a remote server or database. If some or all of the information is stored remotely, the tag itself may house a command sequences that causes it to communicate with the remote server or database, access the desired material, and return it to the device of the user of the system. In other words, links might be stored locally in electronic tags, and related programming materials might be stored remotely.

In its many iterations, the method and apparatus of the present invention can transform a noisy and superficial environment into a rich source of personalized information.

Another object of the invention is to decode, locate, and map electronic tags within the range of the user's device, even though these tags are not visible to the human eye and the user was unaware of their existence prior to the search. Following the scanning or surveying of the environment, the user becomes aware of the existence and possibly the location of those tags that represent objects that are consistent with the search queries and, possibly, the user-specified inventory or listing of keywords or phrases.

Another object of the invention is to provide the user with the ability to surreptitiously and/or unobtrusively scan or read a plurality of electronic tags associated with objects within range of the user's device.

In accordance with a preferred embodiment, the invention comprises (i) a plurality of objects having associated with them electronic tags, (ii) a user set of keywords or phrases, (iii) a control module, and (iv) a transmitter associated therewith. In response to recognizing a tag, the control module accesses the user keywords or phrases and/or an inventory or list of user-specified keywords or phrases, uses this information as a filter, and creates a tailored map of related content linked to the tag.

Another object of the invention is the creation of a program or application ("App") that provides the user with at least one search window for entering at least one search query, causes the user's device to scan or survey the user's environmental location, setting, or range for transponders, transceivers or other machine recognizable features associated with objects, to correlate the information in the transponder, transceiver, or other machine recognizable feature with the objects, to access programming materials related to the objects, to further correlate the programming materials with user-specified keywords, phrases, preferences, or interests and to locate and map the resultant programming material on the user's display. The user of the system may optionally have the capacity to insert keywords and phrases into a plurality of search windows. Moreover, upon the user's selection of an item on the display, further related programming material may be displayed on the user's display. As an example, "Restrooms" may be displayed on the map. If the user touches the icon having this text, he or she may be given the street address of the restrooms, be informed that they are open to the public, and that they are on the first floor of the building.

Another object of the invention is to allow the user to keep search query or queries in the search window or windows from use to use, or to enter new search queries comprising keywords or phrases "on the fly." On a particular occasion, for example, the user may enter "woman seeking man British" and on a subsequent occasion may edit the search query to read "woman seeking man American." The user may also keep his or her device "on" and also leave the app "on," such that as he or she travels from place to place, new hits in new locations will be mapped on the user's display. Moreover, if the user remains in one location, one or more objects on his or her display may change position over time. People, animals, and vehicles would likely change their positions in the world and on the display, whereas buildings would not do so. However, stationary objects such as buildings and environmental features would change their position on the display in relation to the user when the user changes his or her position.

Another object of the invention is for the user of the system to leave his or her device in a given environmental setting, leave or turn the device and the scanning application on, enter search queries, and personally depart the setting, wherein, however, the user's device scans or reads the plurality of electronic tags in the area in which it has been placed in the absence of the user, and, further, wherein the device locates, maps, and stores content and/or programming material linked to electronic tags that is consistent with the user's queries. The user may then access the information collected by the device, either remotely or by returning and physically reclaiming the device. The program can be set to provide a "movie" of the locations, mapping, and movements of objects on the display, along with time stamps.

Another aspect of the invention enables the user of the system to focus exclusively on social networking. Electronically "tagged" printed matters, smart cards, jewelry, other clothing accessories, smart phones and the like can be programmed to provide links to electronic data about the people with whom they are associated. In one example, a male user enters the key term "women seeking men." His device then scans a plurality of tags, which can be narrowed according expanded queries in the case of multiple hits. For example, he can directly expand his search query by keying in "women seeking men age 20s athletic Catholic professional." Or if his system is configured to tailor hits to his preferences or user profile, he need simply key in "women seeking men" and let the system narrow the hits based on matching his preferences or profile. Hits based on the criteria he selects will be returned, with the locations of the tags mapped on his display. He can touch or otherwise access a hit and retrieve whatever data packet the woman has stored (in the tag or remotely). It will presumably contain some information about her and a way for the user to get in touch to begin an exchange of additional information. The exchange will likely include a gradual exchange of more detailed information, enabling each party to decide whether or not to continue to a face-to-face meeting, but that detail is not part of this invention. In another example, the data packet could also take the user to the woman's social networking page.

The invention also provides an improved method of providing shopping services. As an example, a person on a street or in a shopping mall uses the system to key in products of interest. Consider an example in which the person is a woman. Five relevant products for sale are displayed on her display. She touches the icon that interests her the most, representing a pair of shoes in her size, in a preferred color, within her price range, etc. In one preferred embodiment, the user may create a user profile comprising her measurements, photos, and videos, so as to display a CGI-created video of her walking in the shoes. She also learns that the retail venue has made a 30% discount available if she purchases the item before 6:00 p.m. tomorrow, that she can have the item paid for with one of the credit cards or bank debit cards on her phone, that she can have the shoes shipped to the address on her phone or another address, that she can communicate directly with a sales person, and that the shoes are also available in two other colors (and, would she like to see what they would look like if she were wearing them?).

The current invention is an improvement over the prior art in the field of obtaining electronic data by means of scanning visual symbols in printed media. In order to practice the method of scanning visual symbols, the user of the system must first download an "App" to his or her device, or access said App if it is preloaded onto his or her communication device, that will scan a symbol such as a QR code or an invisible watermark. Then the user must locate a symbol for scanning in a printed medium such as a newspaper, a magazine, a poster, and the like and use the App to scan it. Finding such symbols is intermittent, and in the case of a symbol such as an invisible watermark, easy to overlook. In addition, it is difficult for people in a given location, such as in a bookstore, at a display case of books, at a magazine stand, a department store, or in a library to peruse the vast array of publications and other printed matters available for books, articles, or other information of interest to them. For example, the "women's group" of magazines includes information about diet, sex, fashion, celebrities, and related advertisements in many issues, but a potential purchaser might need to flip through every one of them to find specific articles that are of interest. "Men's magazines," similarly, may tend to focus on gear, style, exercise, women, and related advertisements, but learning more about the specifics can require skimming pages or looking for the index of multiple magazines. The present invention provides an efficient and rapid way to examine a plurality of the publications and other printed matter in a given location or setting to determine the location of information of personal interest. The user keys in the topic of interest and retrieves hits locating and mapping the publications with relevant information. Publishers and advertisers may use tags that can be printed on appropriate pages and which contain information that will cause the name and page of a publication to appear on the user's display. By touching or clicking on the icon representing a hit, the user accesses whatever programming material is associated with the tag. That material may all be housed in the tag or on a remote server. In the latter case, it can be updated readily.

A related object of the invention is the association of the printed matters with transponders, transceivers, or other machine recognizable features, which may be attached to the printed matter, embedded in or printed on the printed matter, or located within the same environmental location, setting, or range.

BRIEF DESCRIPTION OF THE DRAWINGS

The above—as well as other—aspects, objects and features of the present invention are described in the Detailed Description below, which is intended to be read in conjunction with the following set of drawings. Although the illustrated embodiment is merely exemplary of systems, methods, and apparati for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DETAILED DESCRIPTION OF THE DRAWINGS

The invention may be understood more readily by reference to the following detailed description of a preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

In this section, the various preferred embodiments of the invention are described. The descriptions provide the insight needed to implement the software or firmware used in connection with the invention, and the various technologies that can be used to implement the components of the present invention.

Figure 1:
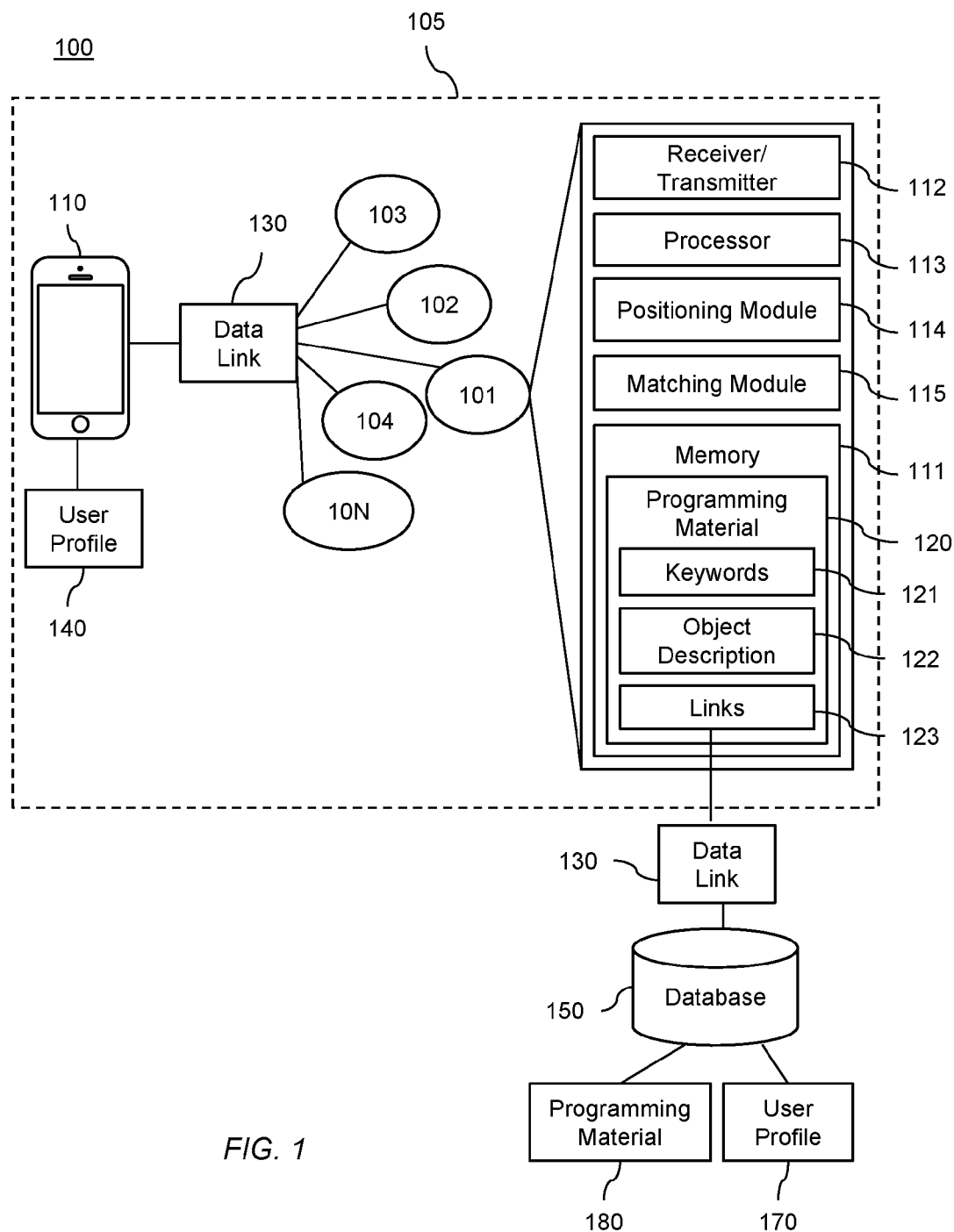
FIG. 1 illustrates a preferred embodiment of the system of the present invention in which a user uses a communication device to capture information about objects in a given location via the scanning of a plurality of electronic tags.

FIG. 1 illustrates a preferred embodiment of the system 100 of the present invention in which a user uses a communication device 110 to capture information about people, objects, services, places, and/or animals ("objects") in a given location 105 via the scanning of a plurality of electronic tags 101-10N in the vicinity. The user's communication device 110 may be any communication device known in the art, or later discovered, including, but not limited to, a handheld communication device, a wireless communication device, a smart phone, a mobile telephone, a cellular telephone, a camera-enabled cellular telephone, virtual reality (VR) glasses (that is, a wearable computer with an optical head-mounted display (OHMD)), a personal digital assistant (PDA), an Internet-enabled telephone, an Internet-enabled device, an intelligent terminal, a smart card, a personal computer, a phablet, a tablet computer, a mini-tablet computer, a laptop computer, a hybrid device, a desktop computer, and any device having a processor. In a preferred embodiment, user communication device 110 comprises a display, a processor, a transmitter, a receiver, a memory, and a user interface (e.g., a touch screen, keyboard, mouse, voice recognition, or the like), as is known in the art.

In a preferred embodiment, the user communication device 110 is equipped with a feature recognition unit capable of reading electronic tags. The feature recognition unit of the communication device 110 enables the communication device 110 to scan the location 105 for electronic tags 101-10N. Such feature recognition unit may include a receiver, transmitter, a transceiver, or a scanner capable of receiving electronic data from the electronic tags 101-10N. As such, as the user carrying the communication device 110 enters the location 105, the feature recognition unit of the user communication device 110 causes it to transmit messages via data links 130 to electronic tags 101-10N located in location 105. Data links 130 may include audio data links, programming data links, online data links, pictorial data links, electronic data links, electronic media links, the Internet, computer networks, local area networks, wireless local area networks, Wi-Fi networks, wide area networks, wireless networks, Ethernet networks, Radio Frequency cellular networks, Bluetooth, Integrated Services Digital Networks, telephone lines, cable television lines, and any combination thereof.

Preferably, the communication device 110 is also equipped with a software, application or "App" to command the communication device 110 to scan or survey the user's environmental location 105, settings, or range for electronic tags associated with objects. The App may be preloaded on the user's communication device 110, or the user may download the App to enable the system of the present invention. In a preferred embodiment, the App also enables the communication device 110 to read the data encoded in a plurality of the tags, to correlate the information in the tag with the user's keywords or phrases, as will be later described, and to receive only that information that is consistent with the keywords or phrases to the user's device, wherein the information is located and mapped on the user's display.

Electronic tags 101-10N comprise any machine recognizable electronic tags known in the art, including, but not limited to transponders, transceivers, RFID tags, rectifying antennas or rectennas, nantennas, NFC tags, proximity tags, smart cards, or other machine recognizable features. In a preferred embodiment, tags 101-10N are associated with objects and carry information about them in the form of programming material or electronic data. The tags may be attached to, or associated with, the objects or located nearby. Referring to tag 101, the tags may include a number of capabilities and may comprise a plurality of components and modules, including, but not limited to a memory 111, receiver/transmitter 112, processor 113, positioning module 114, and matching module 115. Receiver/transmitter 112 may be two separate units or they may be incorporated into a single unit. Receiver/transmitter 112 enables communication between the tag 101 and the communications device 110 via data links 130, such as short-range or medium range radio transmission, Wi-Fi, or the like.

Memory 111 of tag 101 may be preloaded with programming material or electronic data 120, including information about the objects in the vicinity 105. For example, such information may include a description 122 about the objects with which the tag is associated. The description 120 may include location information, such as coordinates, of the object in the vicinity 105. Tag 101 may transmit description information from its memory 111 directly to the user's communication device 110. In another embodiment, tag 101 may contain links 123 to a database 150 which returns remotely stored programming material or information 180 about the objects, including positioning information about their locations and programming material consisting of related information. Tag 101 may communicate to the database 150 via data link 130. Some or all of the programming material may be housed in the electronic tag 101.

Alternately, some programming material 120, such as commands sequences to access or retrieve online information, may be housed in the electronic tag 101 and more programming material 180 may be housed on a remote server or database 150. The resulting experience of the user would in effect be the same.

In another embodiment, electronic data 120 of tag 101 may include other type of links 123, such as online links or URL links. The URL links enable the communication device 110 to automatically be directed to the URL having programming material or information about the objects that are associated with the tags. The online information can be updated continually.

In a preferred embodiment, tag 101 is populated with command sequences and data encoding keywords or phrases 121, wherein the command sequences direct the user's communication device 110 to engage in certain actions, and wherein, further, the encoded keywords or phrases provide brief descriptions of the objects with which they are associated. Particularly, keywords 121 enable the electronic device 110 to tailor the results of the scanned plurality of tags. Keywords 121 are used as matching criteria to locate and map electronic tags in the vicinity linked to content or programming material related to user-specified keywords or phrases. Keywords 121 in the tag will be compared with the user's list or inventory of keywords or phrases. In particular, the user of the communication device 110 may enter searching keywords into the communication device 110. User-specified keywords or phrases may be stored in the user's device 110 or remotely in a user profile 170 as will be later described. Upon scanning tag 101, communication device 110 queries the tag 101 for the keywords 121. Through a comparison process, the communication device 110 determines whether the tag keywords 121 match the user's keywords. The comparison process may occur in the user's communication device 110, or it may occur in the electronic tag 101 by the matching module 115, or remotely via a remote server, for example. In order for the tag 101 to compare its data with the user's keywords or phrases, the tag can be fitted with a processor 113 and a matching module 115. If the keywords 121 match the user's keyword, the communication device 110 accesses programming material or information 120 about tag 101 and displays it to the user. On the other hand, if there is no match, the communication device 110 may not display any information to the user about tag 101. For example, the user may enter the keywords or phrase "Rockport shoes lightweight" into a search window on his or her smart phone to query tags of vendors in the neighborhood as to whether the shoes are available. By also entering keywords and phrases such as "women seeking men," "restrooms," "Sauvignon Blanc," and so forth into the search window—or into a plurality of search windows—the user may retrieve programming material related to many different kinds of objects. Because the world is awash with tags and information, only content that is "of interest" to the user is preferably transmitted to the user.

In some cases, it may be advantageous to base the matching criteria on a user profile or set of preferences. In a preferred embodiment, the user's communication device is associated with a user profile 140. User profile 140 may be stored in the user's communication device 110, or a user profile 170 may be stored in a third party database 150. The user profile 140 enables the communication device 110 to tailor or narrow results according to the interests or preferences of the user. The user can create his or her profile, or establish his or her preferences, by using an "App" or software program that will enable him or her to upload and store demographic information, preferences, interests, wish lists, gift lists, and other personally relevant information. In some cases a list of keywords or phrases may constitute a user profile or set of preferences, or be used by an "App" to construct one. Note, however, that a user listing or inventory of keywords or phrases may also be constructed implicitly or automatically based on inferences drawn from a record of past user behavior, such as recorded telephone or online behavior, past shopping history, location history associated with the user device, or other personally relevant information.

There are many ways to construct listings or inventories of user specified keywords or phrases that can be used to tailor the information the user receives. The present invention is not dependent on any one such method. The user of the system may be asked to provide answers to a series of questions. There may be questions about one's clothing preferences—sizes, colors, styles, pricing limitations, and the like. There may be questions about one's health (conditions, medications, weight, and the like). There may be questions about religious preferences, political preferences, sports preferences, travel and vacation preferences, and preferences in a romantic partner, dating partner, or sex partner. The search program can be configured to extract keywords and phrases from these preferences and use them as groups of search queries to determine which corresponding content or "hits" appear on the user's display.

A user can also be presented with a series of keywords and phrases and be asked to rate them, for example, from "not-at-all important" to "extremely important." As examples, a user could rate words and phrases such as the following as "extremely important": clothing, animals, diets, sales, education, cars, trucks, plays, musicals, medicine, exercise, and "men seeking women." The program could then place "hits" in order such that hits rated as "extremely important" are placed at the top of the list. Alternatively, the user can list his or her own set of keywords or phrases and rate their importance so that, again, the most important hits are to be mapped on the user's display. The user of the system can also select or limit the number of hits to be mapped and displayed. Depending on the size of the display and the type of information the user is seeking, he or she might select display of, say, 6, 8, 10, or 12 hits. The system would be configured so that these hits represent "extremely important" or "very important" keywords or phrases.

Tag 101 may further be equipped with a positioning module 114 that provides to the communication device 110 location information of the tag 101 associated with the objects as well as related programming materials. Positioning module 123 may operate via GPS, triangulation of cellular towers, Wi-Fi-based positioning (WPS), WLAN positioning, Bluetooth sensors, radio frequency (RF) communication, real-time locating systems (RTLS), NFC, long-range sensor positioning, optic (e.g., infrared or visible light) and acoustic (e.g., ultrasound) indoor positioning systems), ultra-wideband (UWB) positioning, and the like. Alternatively, the tag 101 may store its location information in its memory 111 and transmit it to the communication device 110. A set of the hits is then mapped and displayed on the user's device as will be later described.

Figure 2:
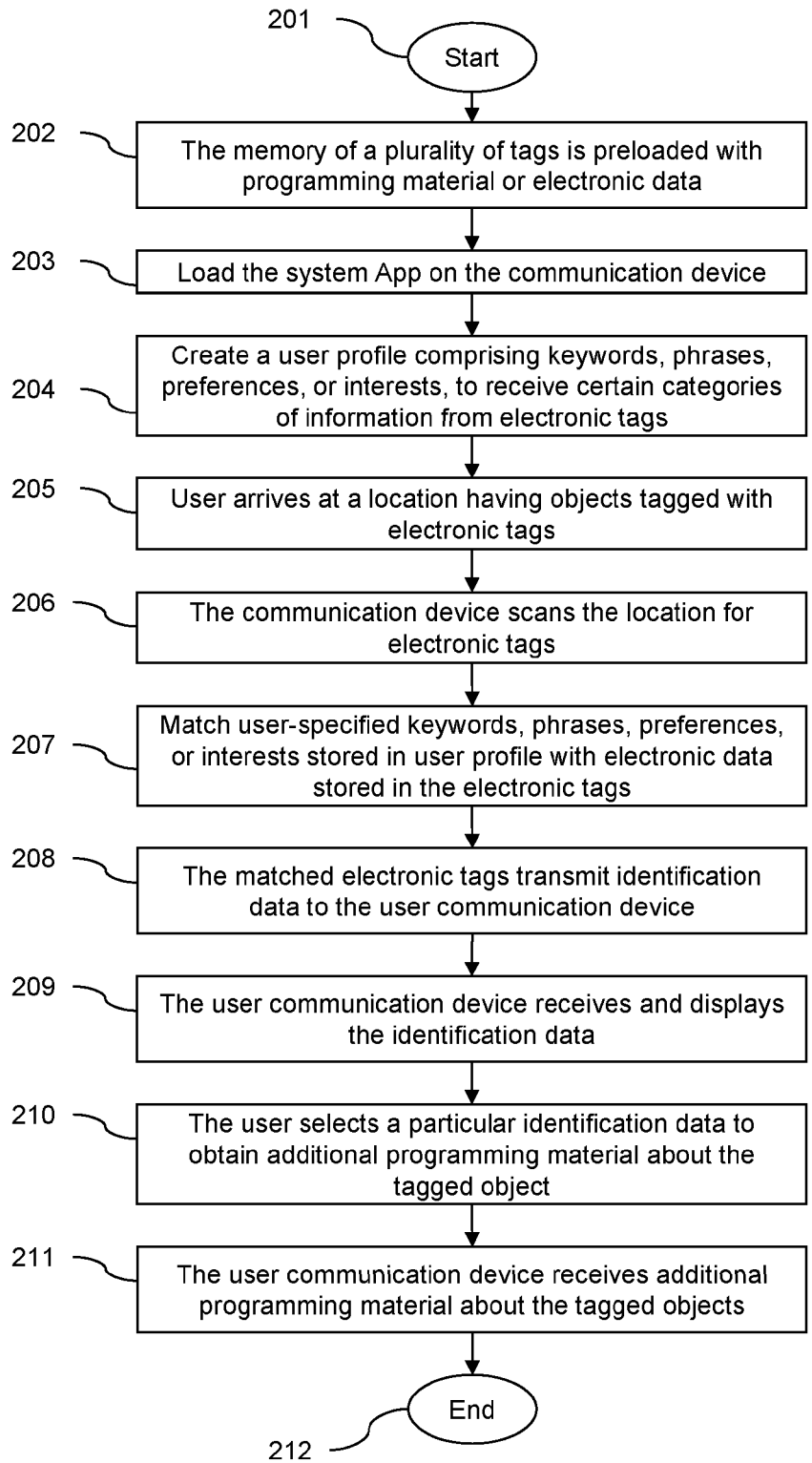
FIG. 2 is a flow chart showing the method of the present invention.

An exemplary method of the present invention is illustrated in FIG. 2. Initially, in step 202, the memory 111 of a plurality of tags 101-10N is preloaded with programming material or electronic data 120. The user may then load the system App on his communication device 110 to enable the system of the present invention in step 203. Next, using the App in step 204, the user may create a user profile 140 or a remotely stored user profile 170 by keying in keywords, phrases, preferences, or interests, such as the following, into his or her search window or windows in the communication device 110: women seeking men, French Bulldogs, and his preferred wine: Sauvignon Blanc. This will enable the user to receive certain categories of information from one or more of the plurality of electronic tags 101-10N. The user carrying the communication device 110 then arrives at a location 105 in step 205. In step 206, the App directs the communication device 110 to scan the location 105 for electronic tags 101-10N. Next, in step 207, the communication device 110, or the tags 101-10N themselves, perform a matching analysis between the user-specified keywords, phrases, preferences, or interests stored in user profile 140 or 170 and electronic data, such as keywords 121 stored in the tags 101-10N. For the electronic tags having keywords 121 that match user-specified keywords, phrases, preferences, or interests, these electronic tags transmit programming material or electronic data 120 to the communication device 110 of the user in step 208. In a preferred embodiment, the matched electronic tags transmit identification data of the electronic tag, for example, in the form of location data, title of the object, brief description of the object, and/or links 123. In turn, in step 209, the communication device 110 of the user receives and displays the identification data of the matched electronic tags on its display screen. The identification data may be displayed to the user in a form of a list. In a preferred embodiment, the identification data of the matched electronic tags is mapped out and displayed in the form of icons on the user communication device 110 as will be later described. In step 210, the user may select to obtain additional programming material about a particular tagged object, for example in the form of object description 122, by selecting the particular tag's identification data. The user communication device 110 in step 211 receives additional programming material 120 from the selected electronic tag about the tagged objects. Alternatively, the user communication device 110 receives remotely stored additional programming material 180 from a remote database 150. The process then ends at 212.

In another embodiment, the user may be presented with a menu of options after the user selects an identification datum or link from his or her display of hits representing objects within range. The user may make the selection by touching the object's representation on the display, in the case of a touch-screen device. The user may alternately click on it or issue a verbal command to select the object. In practice, the user may select a link representing a printed New York Times story on flooding in Bangladesh, then be presented with a menu or series of options, such as learning which shop or newsstand had the physical paper with the transponder; learning the section and page number of the story; accessing an electronic version of the entire story for viewing on his or her device or on another, designated, device; ordering a print copy of the newspaper to be delivered to a designated address; paying for a printed copy of the newspaper; subscribing to the newspaper; saving the story on his or her device or another storage unit; printing out the article; selecting related advertising material on flooding and climate change, the history of Bangladesh, the economy of Bangladesh, and the like; viewing advertisements for merchandise such as Bangladeshi products or books on South Central Asia; the opportunity to donate to a fund for Bangladesh relief; and the like. As such, there are potentially different results depending on whether the information received by user comprises a menu of options or not. If, for example, the information simply indicates that a certain item is available or on sale at a nearby store, the electronic interaction may come to an end. Touching the icon representing the item for sale would have no result; all the information, including the store's location, would be shown on the user's display. However, the user may receive a menu of options about a tagged object. Upon selecting a menu option, the user transmits his or her selection to the content provider, which may comprise more information in the tag, information from a nearby store, or information from a remote database. The content provider then accesses the electronic information associated with the menu option and transmits it to the user's device, where it is displayed on the user's display. There may be submenus and further actions that can be taken, such as obtaining more information, exchanging information, or making a purchase. But after all options are used or explored, the interaction draws to an end.

Figure 3:
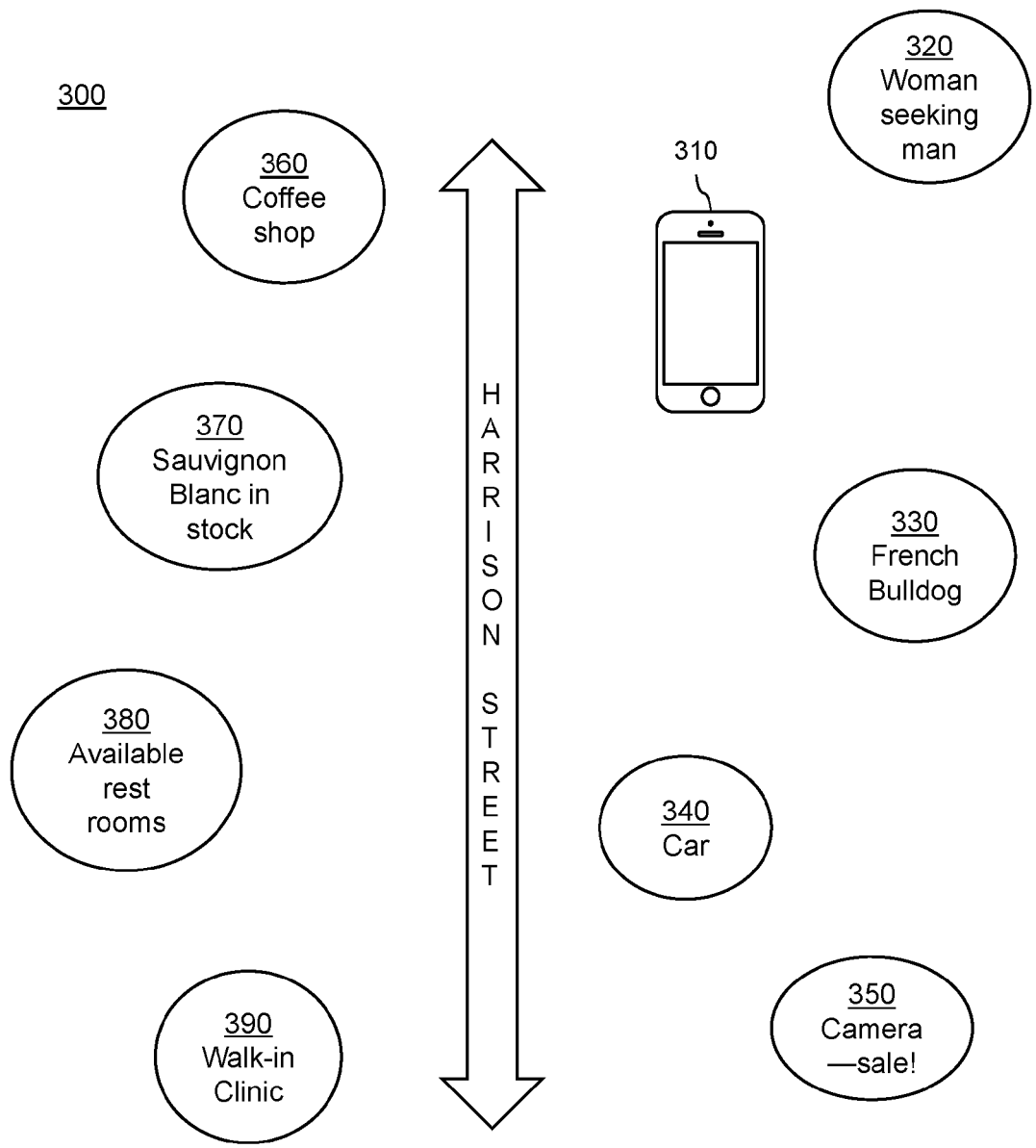
FIG. 3 shows an example of a street with a variety of electronic tags that match the user specified keywords or phrases corresponding to the user's preferences or profile.

FIG. 3 provides an example of the user 310 in a location 300—in this case, Harrison Street—in which there is a plurality of electronic tags 320, 330, 340, 350, 360, 370, 380, 390. A single location 300 may contain any number of electronic tags. The street itself may have at least one electronic tag, which may be associated with information about the commercial establishments on the street, the history of the street, the location of the street in the neighborhood or city, and the like. If the information is presented as a menu of options, the user may be able to obtain information about the availability of merchandise and discounts in establishments that are contributing to the "street" information. The information may be tailored to the user's interests or preferences corresponding to user specified keywords or phrases or to a user profile. In one related embodiment, the woman interested in meeting a man 320 has a mobile telephone which functions as her electronic tag; the telephone has subscriber specific information and personal information, including her "relationship status," games, and links to information at her social networking website. She has keyed search queries into her phone such that the program will cause the phone to signal "men seeking women" who are between the ages of 28 and 45, and who have professional employment.

Referring still to FIG. 3, the French Bulldog has information in an RFID tag 330 that is attached to his collar or implanted in his body. Sample information that is associated with the French Bulldog tag 330 includes the dog's age, vaccination status (which is remotely updatable by the veterinarian), and the phone number of the veterinarian, in case the animal is observed to be wandering by itself. However, additional information could be available if the user receives a menu of options from the dog's tag or a remote source connected with the tag: for example, contact information with the dog's breeder, show or championship history, kennel club connections, nutritional needs, availability for breeding, breeding history, and the like. The camera on sale 350 may have an RFID tag associated with its labeling information or the camera itself. Alternatively, a rectifying antenna or rectenna having electronic information may be printed on its label. The information may also contain links that the user may choose to obtain still more information about the camera, such as model number, serial number(s), megapixels of picture resolution, display size and resolution, and the like. The user may also be able to engage in a subsequent action, such as asking a question about the item or purchasing it using his or her device.

Referring again to FIG. 3, the coffee shop 360 and the walk-in clinic 390 may use electronic tags to advertise their availability. The availability of the rest rooms 380 could be also advertised by the street consortium or by a store in which they are situated. As another example, if the user has either keyed in his or her interest in Sauvignon Blanc, or the wine store has "read" the keywords or phrases comprising a user profile, information about the user's preferred wine 370 may be sent to the user communication device 310. The store might also be in effect broadcasting many pieces of information that are then tailored to the user's profile or preferences by a remote database, the user's mobile device service provider, the processing means within the mobile device, or the like.

By touching or clicking on the displayed item, the user of the system can have the opportunity to interact with the tag to engage in actions such as obtaining more information, making a purchase, or communicating with a human about the information contained in, or associated with, the tag.

Figure 4:
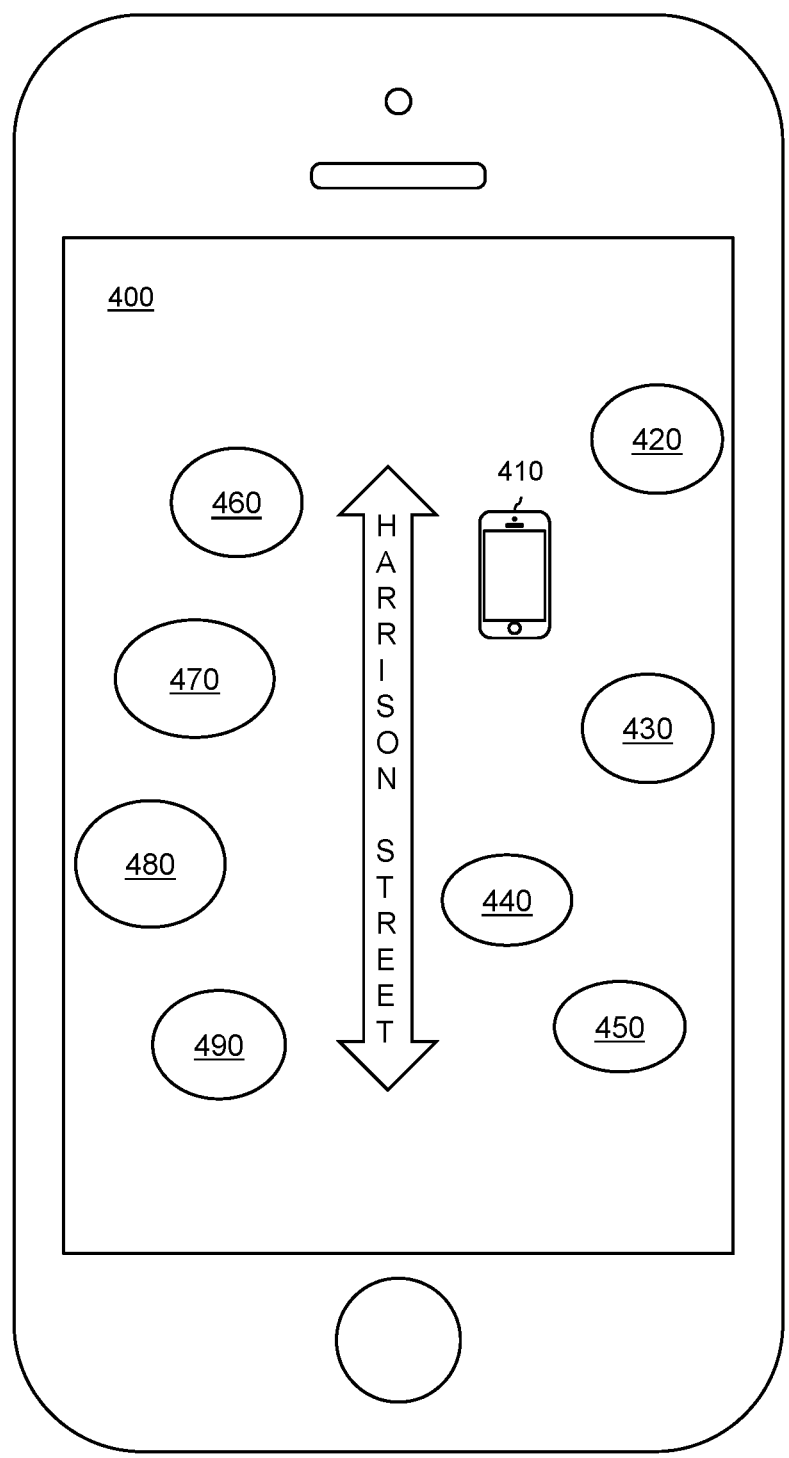
FIG. 4 shows a map of icons representing electronic tags associated with objects displayed on the user's device.

FIG. 4 shows a map 400 of the location 300 of FIG. 3 within range of the user's device—in this case, nearby Harrison Street—as it appears on the user's display. Specifically, FIG. 4 illustrates the display of the mapped identification data of the matched electronic tags in the form of icons as described above. The map 400 coordinates incoming location information based on GPS data transmitted by the plurality of electronic tags, triangulation and trilateration of cell towers, and the like. Other means of obtaining positioning information can include Wi-Fi-based positioning (WPS), WLAN positioning, Bluetooth sensors, radio frequency (RF) communication, real-time locating systems (RTLS), GPS, NFC, long-range sensor positioning, ultra-wide band (UWB) positioning, and the like. The tagged items may be superimposed over an online map such as Google maps and Apple maps or the like. As an example, icons 420, 430, 440, 450, 460, 470, 480, 490 are used to represent the electronic tags 320, 330, 340, 350, 360, 370, 380, 390, respectfully, that have been scanned by the communication device. In addition, map 400 may also include an icon 410 to represent the user communication device and its location with respect to the electronic tags. In a preferred embodiment, only the electronic tags that have keywords that matched the user's profile are displayed. For example, if the user has no interest in cameras, tag 350 associated with the camera sale will not appear on the user's screen in the form of icon 450. Furthermore, icons associated with stationary items such as the coffee shop 450 and the clinic 490 will move only to reflect the movement of the user 410. However, moving items such as the car 440 and the bulldog 430 will change their position on the display based on their own movement as well as the movement of the user 410.

Figure 5:
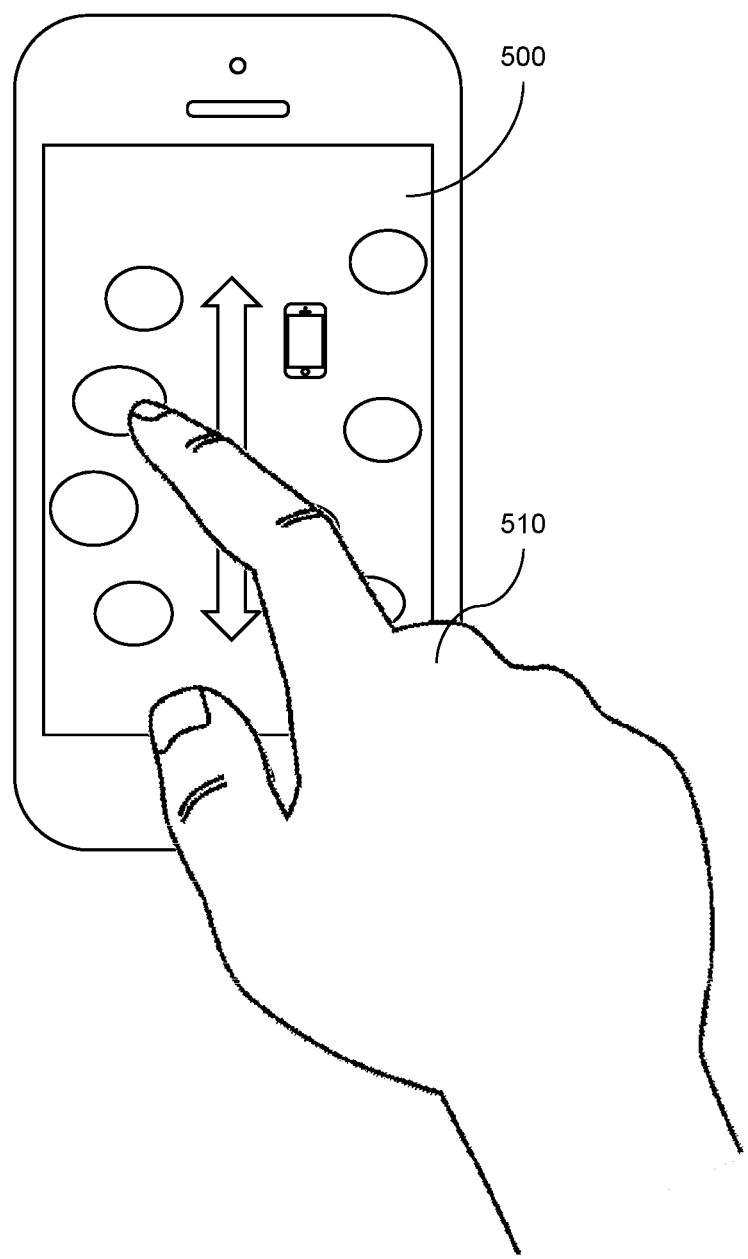
FIG. 5 shows an example in which the user touches the indicated tag locations on the screen map to access more information about the tagged objects.

We now refer to FIG. 5, which shows that the user 510 of the system can access the associated electronic data about the objects with associated electronic tags shown on the display 500 by touching the display 500, which has touchscreen capabilities. FIGS. 4 and 5 map the locations of the electronic tags. The user could then use the touch screen to indicate which item's associated information is desired. FIG. 5 shows the user 510 touching the location 430 associated with the Sauvignon Blanc. Given that the display shows a map, the user is instructed as to where the store having the wine is located.

Figure 6:
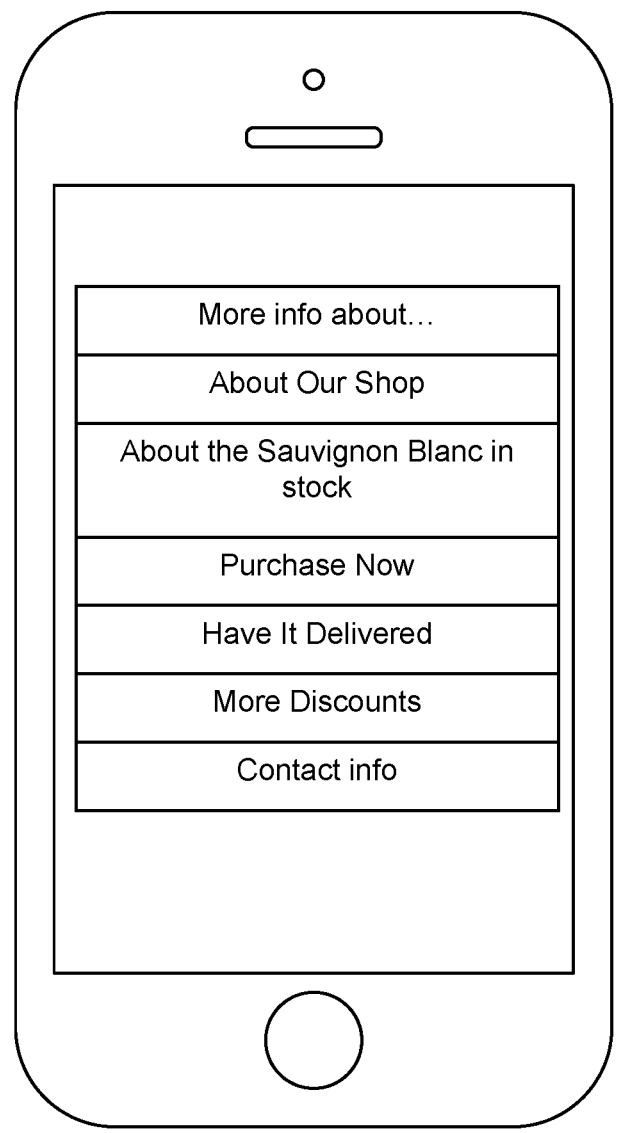
FIG. 6 shows an example of a menu retrieved from touching an item on the screen.

Referring now to FIG. 6, there is shown the types of menu options that might be displayed on the user's display after he or she touches the icon representing the Sauvignon Blanc as being in stock. The user can select options and engage in further activity related to the wine, or he or she can return to the map (FIG. 4) to obtain more information about other tagged objects.

Figure 7:
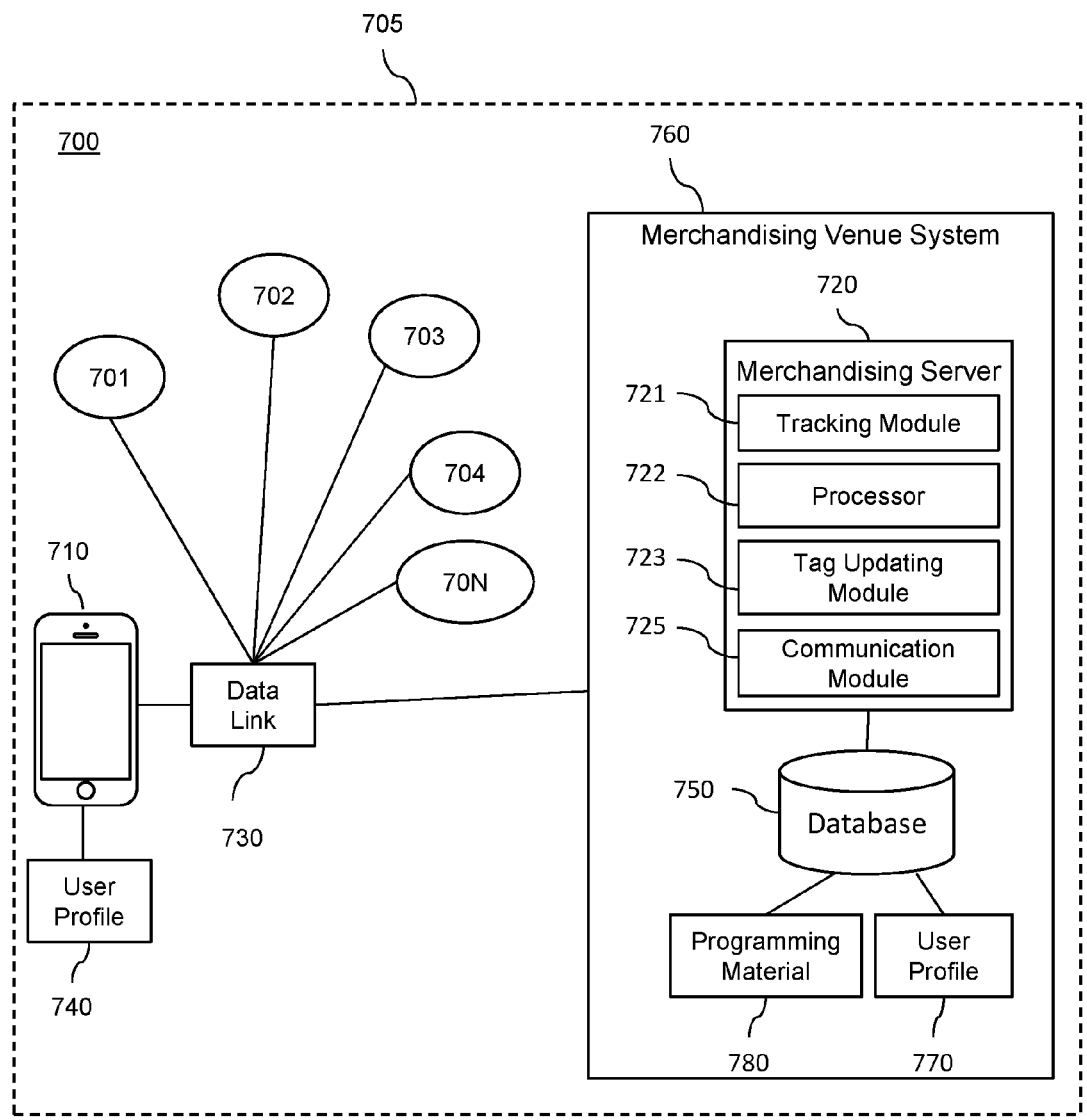
FIG. 7 shows embodiments the invention in a merchandising venue.

FIG. 7 illustrates an embodiment of a system 700 of the present invention as it applies to electronic tags associated with merchandise or services in a merchandising venue 705. Specifically, FIG. 7 depicts a user (the consumer) communications device 710 and a merchandising venue system 760. In a preferred embodiment, the merchandising venue system 760 is associated with a venue 705 to communicate with a communication device 710 located within venue 705 or in the vicinity of venue 705. The merchandising venue system 760 generally comprises a merchandising server 720 and a database 750. The merchandising server 720 may comprise a tracking module 721, a processor 722, tag updating module 723, and a communication module 725.

The database 750 can be co-located with the merchandising server 720, or it can be located remotely in various different systems and locations. The relationship may involve remote merchandising server 720 and database 750 or the merchandising server 720 and/or database 750 can be housed within the merchandising venue 705. In addition, the merchandising server 720 can be completely integrated with the database 750. Note, however, that the processor 722 and communication module 725 of the merchandising venue system 760 can be instead connected via a network to a third party database. The third party database may be that of a service provider that also engages in functions such as the following: establishing the firmware and software that comprise the invention's methods and apparatus in or in the vicinity of the merchandising venue, creating the "App" that is downloaded to the device of the user of the system, and creating and operating venue subsystems that track the user location and create, store, and update programming material for the electronic tags.

The tracking module 721 enables the merchandising venue system 760 to respect the privacy of the user. The merchandising system 760 makes contact with the user (consumer) communication device 710 only after the user enters a venue 705 (e.g., a brick and mortar retail location) or its immediate proximity. After the entry, device 710, enabled by the user, establishes communication with the merchandising system 760 associated with the venue 705. Tracking module 721 tracks the location of the consumer device 710.

The electronic tags 701-70N preferably contain electronic data provided by the merchandising venue system 760. In a preferred embodiment, merchandising server 720 contains a tag updating module 723 for creating, storing, and updating programming material in the tags.

The customer or user carrying the communication device 710 arrives in the vicinity of, or within, the merchandising venue 705. His or her communication device 710 is on and contains the system App. The user keys in products and services of interest as described above. Communication is thus initiated between the user's device 710 and the electronic tags 701-70N within range of the device 710. The information in the tags is downloaded by the user's device. The information from the tags can go directly to the user's device 710 through data links 730 such as short-range or medium range radio transmission, or Wi-Fi. The tags 701-70N may contain the information that is transmitted to the user device 710, or the information may, via data links, be obtained from the venue database 750 via communication module 725 or from the third party database. In any of these cases, the experience for the user or customer will be seamless.

Referring again to FIG. 7, the matter of which tags 701-70N will communicate with the communication device 710 of the user of the system (customer) can be based on the user's ratings of the relative importance of keyword or phrases corresponding to products and services entered into the search window(s) or represented in a user profile. The profile may be stored in the user's device 740, the venue's database 770, or a third party database. It may be further advisable for the venue to limit the communications transmitted to the user's device 710 so as not to overwhelm the user.

The communications that are transmitted to the user's device 710 are located and mapped on the user's display, as suggested in FIG. 4. Or the map may display the entire venue and illustrate the customer moving within, if the venue is not so large that the customer will be "lost" in the map as a meaningless speck. With the tags displayed on the map, as in FIG. 4, the customer may touch the representation of a tag to obtain the information associated with a tag. Information can be visually displayed, auditorily displayed, or as in the cases of virtual reality glasses or a wearable computer with an optical head-mounted display (OHMD), the display may include visual and auditory modalities.

Referring once more to FIG. 3, the search function may be employed at a mall, street, neighborhood, town, village city, or region. Each venue shown in the figure may continually update merchandise and services that are available to users, along with more information or programming material about the merchandise and services, such as photos or videos, sizes, colors, reviews, locations, and the like. The updating may occur at the store or local venue level, but information relating to the updating is transmitted to at least one database 750 via wired or wireless networks. The database is remote to any particular venue, but may be housed nearby, as within or nearby a shopping mall, or more distantly. The database may also be networked with databases or servers in any location, no matter how geographically distant.

Figure 8:
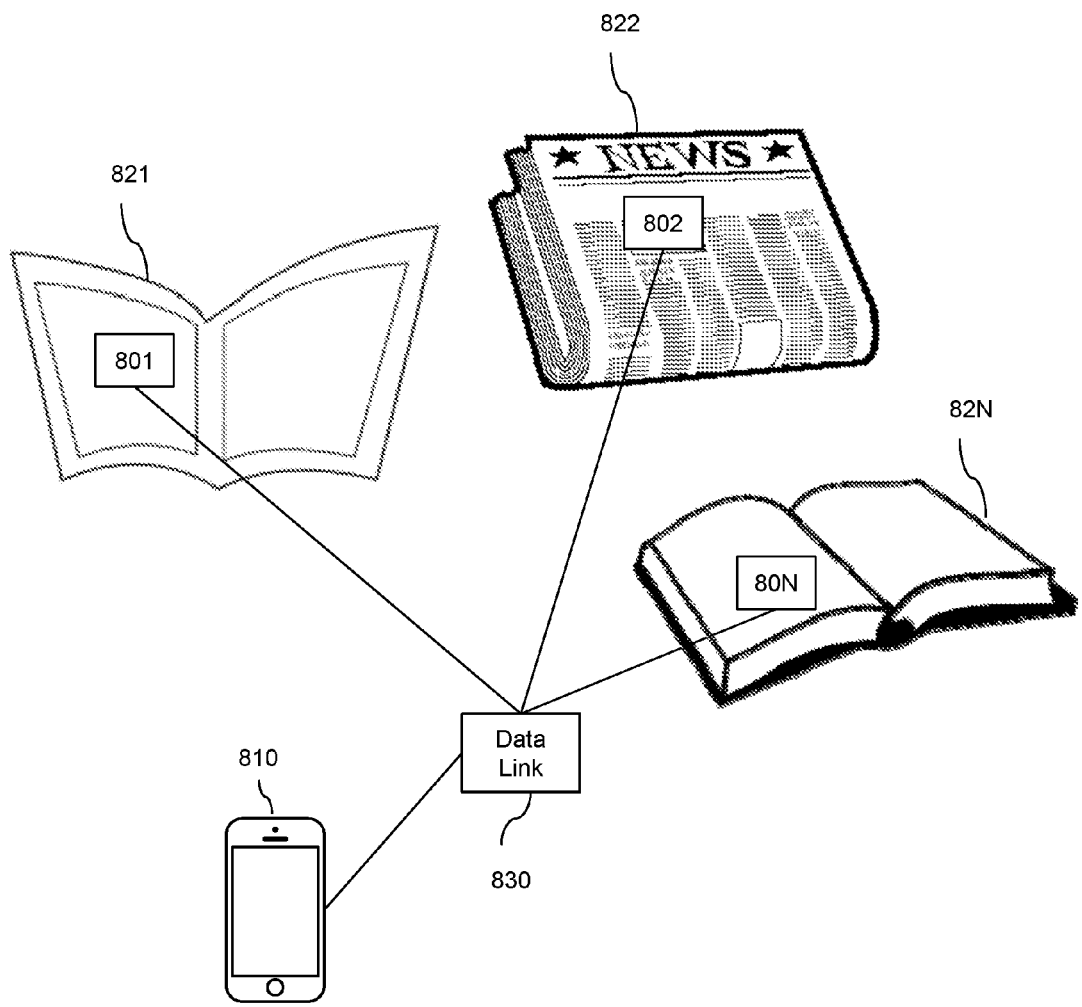
FIG. 8 shows an embodiment of the present invention with printed matters.

FIG. 8 shows the usage of the present invention with printed matters 821-82N. In this example, the user of the system wishes to locate newspaper 822 and/or magazine 821 stories about a crisis in the Middle East, about an upcoming election in the Senate or House of Representatives, or about an auction of paintings by Andy Warhol and Normal Rockwell. Therefore, the user inserts key words including "Syria," "Lebanon," "Turkey," "election," "senate," "house of representatives," "Texas" (a state whose elections are of particular interest to the user), "Warhol," "Rockwell," and "auction" in the communication device 810. Stories in the printed matters 821-82N are furnished with electronic tags 801-80N containing electronic data that engage in some combination of the following: (1) identifying the publication, (2) naming the particular item of interest, (3) specifying the location of the item or article in the printed matter, (4) providing additional subject matter stored within the tag, (5) providing links to additional or supplementary subject matter in a remote, updatable database, (6) allowing the user to take subsequent related actions, for example, purchasing at least one of the identified publications or submitting letters to the editor about the subject matter.

The user arrives in the vicinity of a plurality of printed matters 821-82N. He or she turns the scanning App on using the communication device 810. The user communication device's 810 display shows a map of relevant printed matters within range of his or her device. Some are for sale in a newsstand, perhaps, whereas others are in the possession of people nearby. The user takes the above-noted subsequent actions, also, for example; ordering printed matters in the possession of other people and, when they arrive, reading the stories in the printed matters; or ordering electronic versions of the desired stories, paying for them electronically, downloading them, and reading them.

Although the invention has been described above with reference to several presently preferred embodiments, such embodiments are merely exemplary and are not intended to define the scope of, or exhaustively enumerate the features of, the present invention. Accordingly, the scope of the invention shall be defined by the following claims. Where a feature or limitation of a preferred embodiment is omitted in a claim, it is the inventors' intent that such claim not be construed to impliedly require the omitted feature or limitation.

What is claimed is:

1. A method for mapping and displaying information to a user, comprising:
    reading with a feature recognition unit of a communication device associated with the user a plurality of electronic tags located at a mall, wherein each electronic tag is associated with an object located at the mall and wherein each electronic tag comprises electronic data including location information of the associated object at the mall, and a link to access electronic information about the associated object;
    identifying the electronic tags having encoded data, or remote access to data, corresponding to, or matching, user-specified keywords, phrases, preferences or interests;
    receiving by the communication device from the identified tags location information and links to access electronic information about the associated objects;
    displaying on said communication device a map of the vicinity and icons associated with corresponding links at locations coordinated with the location information of the identified electronic tags; and wherein
    upon a selection of an icon by a user, the communication device displays a plurality of menu options related to the object associated with the selected link;
    and wherein the plurality of menu options is selected from the group consisting of additional information about the object, additional information about items associated with the object, photos or videos, the option to obtain directions to the selected object to assist the user in navigating to the object, the option to communicate with the object, the option to purchase merchandise or services, the option to obtain discounts, the option to get into contact another person about the object, the option to enter another keyword to further refine the electronic information transmitted to the communication device, the option to limit the number of objects on the display, the option to delete an object shown on the display, and any combination thereof.

2. The method of claim 1 wherein said object is selected from the group consisting of a store, a restaurant or coffee shop, a service venue, available rest rooms, a walk-in clinic, another person, an animal, a car, and any combination thereof.

3. The method of claim 1 wherein said plurality of electronic tags is located at the group consisting of a street, a neighborhood, a town, a village, a city, a region, and any combination thereof.

4. The method of claim 1, wherein the step of identifying the electronic tags is performed by each electronic tag of the plurality of tags or by the communication device.

5. The method of claim 1, wherein the step of identifying the electronic tags is performed by a remote server that receives encoded data corresponding to the user specified keywords, phrases, preferences, or interests, and tracks electronic tags within the vicinity of the communication device.

6. The method of claim 1, wherein the electronic information about the associated object is stored in the electronic tag or in a remote database.

7. The method of claim 1, wherein said electronic information is associated with objects selected from the group comprising services, people, places, animals, and any combination thereof.

8. The method of claim 1, wherein said communication device is selected from the group consisting of a handheld communication device, a wireless communication device, a mobile telephone, a smart phone, a cellular telephone, a personal digital assistant (PDA), an Internet-enabled telephone, a tablet computer, a laptop computer, a desktop computer, a hybrid device, and any combination thereof.

9. The method of claim 1, wherein said electronic tags are selected from the group consisting of transponders, transceivers, mobile phones, radio-frequency identification tags, rectifying antennas, nantennas, near-field communication tags, proximity tags, and smart cards.

10. The method of claim 1, wherein the map shifts position according to a movement of the communication device within the vicinity.

11. The method of claim 1, wherein the user selects an icon by touching, clicking on, or otherwise activating the icon displayed on the communication device.

12. The method of claim 1, wherein the communication device communicates with the plurality of electronic tags using a data link selected from the group consisting of an audio data link, a programming data link, an online data link, a pictorial data link, an electronic data link, an electronic media link, the Internet, a computer network, a local area network, a wireless local area network, a Wi-Fi network, a wide area network, a wireless network, an Ethernet network, a Radio Frequency cellular network, Bluetooth, an Integrated Services Digital Network, a telephone line, a cable television line, a satellite television dish, and any combination thereof.

13. The method of claim 1, wherein the location information of the associated object within the vicinity is stored in each electronic tag.

14. method of claim 1, wherein the location information of the associated object within the vicinity is determined by each electronic tag via a positioning module operating via global positioning system signals, triangulation of cellular towers, Wi-Fi-based positioning (WPS), wireless local area network positioning, Bluetooth sensors, radio frequency (RF) communication, real-time locating systems (RTLS), near-field communication, long-range sensor positioning, optic (e.g., infrared or visible light) and acoustic (e.g., ultrasound) indoor positioning systems, ultra-wideband (UWB) positioning, or any combination thereof.

15. A method for mapping and displaying information to a user, comprising:
reading with a feature recognition unit of a communication device associated with the user a plurality of electronic tags located on a street, wherein each electronic tag is associated with an object located on the street and wherein each electronic tag comprises electronic data including location information of the associated object on the street, and a link to access electronic information about the associated object;
identifying the electronic tags having encoded data, or remote access to data, corresponding to, or matching, user-specified keywords, phrases, preferences or interests;
receiving by the communication device from the identified tags location information and links to access electronic information about the associated objects;
displaying on said communication device a map of the vicinity and icons associated with corresponding links at locations coordinated with the location information of the identified electronic tags; and wherein
upon a selection of an icon by a user, the communication device displays a plurality of menu options related to the object associated with the selected link;
and wherein the plurality of menu options is selected from the group consisting of additional information about the object, additional information about items associated with the object, photos or videos, the option to obtain directions to the selected object to assist the user in navigating to the object, the option to communicate with the object, the option to purchase merchandise or services, the option to obtain discounts, the option to get into contact another person about the object, the option to enter another keyword to further refine the electronic information transmitted to the communication device, the option to limit the number of objects on the display, the option to delete an object shown on the display, and any combination thereof.

16. The method of claim 15 wherein said object is selected from the group consisting of a store, a restaurant or coffee shop, a service venue, available rest rooms, a walk-in clinic, another person, an animal, a car, and any combination thereof.

17. The method of claim 15, wherein the step of identifying the electronic tags is performed by the group consisting of each electronic tag of the plurality of tags, by the communication device, by a remote server that receives encoded data corresponding to the user specified keywords, phrases, preferences, or interests, and tracks electronic tags within the vicinity of the communication device, and by any combination thereof.

18. A method for mapping and displaying information to a user, comprising:
reading with a feature recognition unit of a communication device associated with the user a plurality of electronic tags located in a neighborhood, wherein each electronic tag is associated with an object located in the neighborhood and wherein each electronic tag comprises electronic data including location information of the associated object in the neighborhood, and a link to access electronic information about the associated object;
identifying the electronic tags having encoded data, or remote access to data, corresponding to, or matching, user-specified keywords, phrases, preferences or interests;
receiving by the communication device from the identified tags location information and links to access electronic information about the associated objects;
displaying on said communication device a map of the vicinity and icons associated with corresponding links at locations coordinated with the location information of the identified electronic tags; and wherein
upon a selection of an icon by a user, the communication device displays a plurality of menu options related to the object associated with the selected link;
and wherein the plurality of menu options is selected from the group consisting of additional information about the object, additional information about items associated with the object, photos or videos, the option to obtain directions to the selected object to assist the user in navigating to the object, the option to communicate with the object, the option to purchase merchandise or services, the option to obtain discounts, the option to get into contact another person about the object, the option to enter another keyword to further refine the electronic information transmitted to the communication device, the option to limit the number of objects on the display, the option to delete an object shown on the display, and any combination thereof.

19. The method of claim 18 wherein said object is selected from the group consisting of a store, a restaurant or coffee shop, a service venue, available rest rooms, a walk-in clinic, another person, an animal, a car, and any combination thereof.

20. The method of claim 19, wherein the step of identifying the electronic tags is performed by the group consisting of each electronic tag of the plurality of tags, by the communication device, by a remote server that receives encoded data corresponding to the user specified keywords, phrases, preferences, or interests, and tracks electronic tags within the vicinity of the communication device, and by any combination thereof.

* * * * *